UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

PROCESS OF MAKING INSOLUBLE BODIES DERIVED FROM PHENOL ALCOHOLS.

1,038,475.  Specification of Letters Patent.  Patented Sept. 10, 1912.

No Drawing. Original application filed October 4, 1909, Serial No. 520,850. Divided and this application filed July 6, 1911. Serial No. 637,085.

*To all whom it may concern:*

Be it known that I, LEO H. BAEKELAND, a citizen of the United States, residing at Yonkers, in the county of Westchester and State of New York, have invented certain new and useful Improvements in Processes of Making Insoluble Bodies Derived from Phenol Alcohols, of which the following is a specification.

It has been heretofore shown (see Beilstein, *Organische Chemie*, 1896, Vol. II, page 1109; also French Patent 350,180, British Patent 15,517 of 1905, and German Patent 189,262, to Fabriques de Produits de Chimie Organique de Laire) that phenol-alcohols, such for example as ortho-oxybenzyl alcohol (saligenin) and paraoxybenzyl alcohol, yield by elimination of water, resinous bodies or anhydrids which are known as saliretins or saliretin products. These dehydration products are soluble in alkaline solutions and in certain organic solvents, and melt at 110° C., or above. I have also shown (see "On soluble, fusible, resinous condensation products of pheynols and formaldehyde," L. H. Baekeland, *Journal of Industrial and Engineering Chemistry*, August, 1909), that similar products are obtained by heating phenol-alcohols in presence of a very small excess of phenol, the products thus obtained being characterized by great fusibility and solubility.

The present invention relates to the treatment of phenol-alcohols or their anhydrids to produce bodies in such condition as regards homogeneity and texture that they can be used for various technical purposes.

The term "anhydrids" is herein used to include both the partial and complete anhydrids of phenol-alcohols, or in general all dehydration products thereof, known also collectively as "saliretins," irrespective of the manner in which they are prepared.

In my co-pending application, Serial Number 520,850, filed Oct. 4, 1909, of which the present application is a division, I have described and claimed a process whereby the phenol-alcohols or their dehydration products are converted by the action of heat and pressure into hard, compact and infusible bodies or molded articles. In said application I have also stated that the process can be facilitated by the addition of so-called condensing agents, as for instance acids, salts or bases; and that the hardness of the material can be further increased by the addition of formaldehyde, the polymers of formaldehyde, or such substances as engender formaldehyde during the process.

The object of the present process is the transformation of phenol-alcohols, or their anhydrids, into hard, infusible bodies of great strength, such bodies not being much affected by ordinary solvents and chemicals, and adapted for use in the manufacture of molded goods, and for several of the purposes for which ordinary plastics, like hard rubber and celluloid, have been used heretofore. This is accomplished by heating the above-mentioned substances with formaldehyde, either alone or in presence of a so-called condensing or catalytic agent, for instance, a base.

Instead of ordinary formaldehyde, I may use the polymers of formaldehyde, or such substances as engender formaldehyde during the process.

As stated above, it may be advantageous to use formaldehyde or its equivalents in conjunction with a base. If this base be ammonia, it will immediately react with formaldehyde to form hexamethylentetramin, as pointed out in my prior U. S. Patent No. 942,809, issued Dec. 7, 1909. See also Moschatos and Tollens, *Ann. der Chemie*, 272,280; Carl Goldschmidt, *Formaldehyde*, page 29, Bonn, verlag von Friedrich Cohen, 1903, etc. So that the technical effect is the same whether hexamethylentetramin be introduced as such or as a mixture of ammonia and formaldehyde.

Instead of starting with pure or commercial phenol-alcohols, I may use with advantage their anhydrids, including their resinous dehydration products as obtained by the process of De Laire above referred to by any other suitable process.

The process is considerably hastened by the use of relatively high temperatures, in which case the heating is best done under pressure.

Under the name of "phenol-alcohols," I desire to designate not only the first member of the group, oxybenzyl alcohol, but the homologues or mixtures of these products as obtained by the suitable treatment of commercial phenols or cresols.

By the term "formaldehyde" in the claims, I desire to include the polymers of formaldehyde and in general such substances as engender formaldehyde during the process or are equivalent thereto in technical effect.

Instead of using phenol-alcohols or their anhydrids alone, it is very desirable to incorporate suitable filling materials or other substances which tend to improve the physical or chemical qualities of the final product. Such addition may be made at any time before the final treatment by heat or by heat and pressure. Such filling materials or other substances may comprise any of the substances mentioned in my prior patents and publications as suitable for these purposes. For example, as described in my prior Patent 942,699, issued Dec. 7, 1909, the product may be employed in admixture with a great variety of solid, semi-solid or liquid materials in accordance with the particular uses for which it is intended, and in much the same manner as india rubber is compounded to yield various valuable products. For instance, such additions may comprise asbestos fiber, wood fiber, other fibrous or cellular materials, mineral powders, pigments, or similar materials which may reduce the shrinking stresses of the mass and improve its physical properties; or they may comprise resins or gums, and in general such organic bodies as are capable of exerting some solvent action, however slight, upon the initial or partial condensation products of phenols and formaldehyde to form solid solutions in or with the mass and to impart to it an added plasticity. Typical bodies of the latter class are such as are described in my copending application Ser. No. 531,000, filed December 2, 1909, to wit naphthalene, anthracene, or other hydrocarbons, analin, phenols, or other phenolic bodies, pitch, asphaltum, cumeron resins, other resinous matters, paraffin, and the like.

I claim:

1. The process of transforming phenol-alcohols or their anhydrids into hard, coherent infusible bodies, which consists in reacting thereon with formaldehyde or bodies capable of engendering formaldehyde.

2. The process of transforming phenol-alcohols or their anhydrids into hard, coherent infusible bodies, which consists in reacting thereon in presence of condensing agents with formaldehyde or bodies capable of engendering formaldehyde.

3. The process of transforming phenol-alcohols or their anhydrids into hard, coherent infusible bodies, which consists in reacting thereon with formaldehyde or bodies capable of engendering formaldehyde, under the action of heat and pressure.

4. The process of transforming phenol-alcohols or their anhydrids into hard, coherent infusible bodies, which consists in reacting thereon in presence of condensing agents with formaldehyde or bodies capable of engendering formaldehyde, under the action of heat and pressure.

5. The process of transforming phenol-alcohols or their anhydrids into hard, coherent bodies, which consists in incorporating therewith formaldehyde or bodies capable of engendering formaldehyde and suitable filling materials, and hardening the mass.

6. The process of transforming phenol-alcohols or their anhydrids into hard, coherent bodies, which consists in incorporating therewith formaldehyde or bodies capable of engendering formaldehyde and suitable filling materials, and hardening the mass by the action of heat and pressure.

7. The process of transforming phenol-alcohols or their anhydrids into hard, coherent bodies, which consists in incorporating therewith formaldehyde or bodies capable of engendering formaldehyde and substances tending to improve the physical or chemical qualities of the final product, and hardening the mass.

8. The process of transforming phenol-alcohols or their anhydrids into hard, coherent bodies, which consists in incorporating therewith formaldehyde or bodies capable of engendering formaldehyde and substances tending to improve the physical or chemical qualities of the final product, and hardening the mass by the action of heat and pressure.

9. The process of making hard, compact and infusible bodies, which consists in eliminating water from phenol-alcohols, and hardening the material, in presence of formaldehyde, by the action of heat and pressure.

10. The process of making hard, compact infusible bodies, which consists in eliminating water from phenol-alcohols and hardening the material, in presence of formaldehyde and suitable filling materials, by the action of heat and pressure.

11. The process of preparing hard, coherent and infusible bodies from anhydrids of phenol alcohols, such for example as the fusible resinous substances corresponding thereto which consists in reacting thereon with formaldehyde or bodies capable of engendering formaldehyde.

12. The process of preparing hard, coherent and infusible bodies from anhydrids of phenol alcohols, such for example as the fusible resinous substances corresponding thereto which consists in reacting thereon, under the influence of heat and pressure, with formaldehyde or bodies capable of engendering formaldehyde.

13. As a new composition of matter, a mixture of an anhydrid of phenol-alcohols and a formaldehyde generating substance, said mixture being transformable by the application of heat and pressure into compact, homogeneous, infusible bodies.

14. The process of transforming phenol-alcohols or their anhydrids into hard, coherent, infusible bodies, which consists in reacting thereon in presence of a basic condensing agent with formaldehyde or bodies capable of engendering formaldehyde.

15. The process of making hard, compact and infusible bodies, which consists in eliminating water from phenol-alcohols, and hardening the material in presence of formaldehyde and a base.

16. The process of making hard, compact and infusible bodies, which consists in eliminating water from phenol-alcohols, and hardening the material in presence of formaldehyde and a base by the action of heat and pressure.

17. The process of making hard, compact and infusible bodies, which consists in heating phenol-alcohols or anhydrids thereof in presence of a suitable base and formaldehyde or a body capable of engendering formaldehyde.

18. The process of making hard, compact and infusible bodies, which consists in heating phenol-alcohols or anhydrids thereof under pressure and in presence of a suitable base and formaldehyde or a body capable of engendering formaldehyde.

19. A new composition of matter containing an anhydrid of phenol-alcohols, formaldehyde or a body capable of engendering formaldehyde, and a base, said composition capable of transformation by the application of heat and pressure, into a hard, coherent and infusible body.

20. The method of hardening saliretin products which consists in reacting thereon with formaldehyde.

21. The method of hardening saliretin products which consists in reacting thereon with formaldehyde in presence of a base.

22. The method of hardening bodies of the saliretin type which consists in reacting thereon with formaldehyde.

23. The method of hardening bodies of the saliretin type which consists in reacting thereon with formaldehyde in presence of a base.

24. The method of hardening dehydrated derivatives of phenol-alcohols which consists in reacting thereon with formaldehyde.

25. The method of hardening dehydrated derivatives of phenol-alcohols which consists in reacting thereon with formaldehyde in presence of a base.

26. A new composition of matter containing a saliretin product and formaldehyde, said composition transformable by the application of heat and pressure into a compact, homogeneous, infusible body.

27. A new composition of matter containing a saliretin product, formaldehyde and a base, said composition transformable by the application of heat and pressure into a compact, homogeneous, infusible body.

28. A new composition of matter containing a body of the saliretin type and a substance possessing a methylene group in condition to react thereon, said composition transformable by the application of heat and pressure into a compact, homogeneous, infusible body.

29. A new composition of matter containing a body of the saliretin type, a substance possessing a methylene group in condition to react thereon, and a base, said composition transformable by the application of heat and pressure into a compact, homogeneous, infusible body.

30. The process of preparing hard coherent and infusible phenolic condensation products from fusible resinous substances made by reaction of formaldehyde on phenol, which consists in reacting thereon with formaldehyde or bodies capable of engendering formaldehyde.

31. The process of preparing hard coherent infusible phenolic condensation products from fusible resinous substances made by reaction of formaldehyde on phenol, which consists in reacting thereon with a body containing methylene groups in condition to combine therewith.

32. The process of preparing hard coherent and fusible phenolic condensation products from fusible resinous substances of the saliretin type made by reaction of formaldehyde on phenol, which consists in reacting thereon with formaldehyde or bodies capable of engendering formaldehyde.

33. The process of preparing hard coherent infusible phenolic condensation products from fusible resinous substances of the saliretin type made by reaction of formaldehyde on phenol, which consists in reacting thereon with a body containing methylene groups in condition to combine therewith.

In testimony whereof, I affix my signature in presence of two witnesses.

LEO H. BAEKELAND.

Witnesses:
 HENRY E. SCHLOBOHM,
 JOHN J. NAUGHTON.